United States Patent
Foster

(10) Patent No.: US 7,428,273 B2
(45) Date of Patent: Sep. 23, 2008

(54) METHOD AND APPARATUS FOR EFFICIENT PREAMBLE DETECTION IN DIGITAL DATA RECEIVERS

(75) Inventor: Mark J. Foster, Palo Alto, CA (US)

(73) Assignee: Promptu Systems Corporation, Menlo Park, CA (US)

(*) Notice: Subject to any disclaimer, the term of this patent is extended or adjusted under 35 U.S.C. 154(b) by 775 days.

(21) Appl. No.: 10/944,503

(22) Filed: Sep. 16, 2004

(65) Prior Publication Data

US 2005/0063493 A1    Mar. 24, 2005

Related U.S. Application Data

(60) Provisional application No. 60/504,171, filed on Sep. 18, 2003.

(51) Int. Cl.
*H03D 3/22* (2006.01)
*H04L 27/22* (2006.01)

(52) U.S. Cl. .................. 375/329; 375/279; 375/308; 375/324; 375/325; 375/340

(58) Field of Classification Search .......... 375/329, 375/308, 279, 324, 325, 340
See application file for complete search history.

(56) References Cited

U.S. PATENT DOCUMENTS

| | | | | |
|---|---|---|---|---|
| 5,574,399 | A * | 11/1996 | Oura et al. .................. 329/306 |
| 5,960,028 | A * | 9/1999 | Okamoto et al. ............ 375/130 |
| 6,320,947 | B1 | 11/2001 | Joyce |
| 6,374,177 | B1 | 4/2002 | Lee |
| 6,381,316 | B2 | 4/2002 | Joyce |
| 6,519,275 | B2 * | 2/2003 | Callaway et al. ............ 375/140 |
| 6,606,341 | B1 | 8/2003 | Kanterakis et al. |
| 6,658,414 | B2 | 12/2003 | Bryan |
| 6,711,543 | B2 | 3/2004 | Cameron |
| 6,714,632 | B2 | 3/2004 | Joyce et al. |
| 6,721,633 | B2 | 4/2004 | Funk |
| 6,725,022 | B1 | 4/2004 | Clayton |
| 6,728,531 | B1 | 4/2004 | Lee |
| 6,799,201 | B1 | 9/2004 | Lee |

(Continued)

FOREIGN PATENT DOCUMENTS

EP    1341363    9/2003

(Continued)

OTHER PUBLICATIONS

Divsalar, Dariush and Marvin K. Simon; "Multiple-Symbol Differential Detection of MPSK"; IEEE Transactions on Communication; vol. 38, No. 3, Mar. 1990.

*Primary Examiner*—Ted Wang
(74) *Attorney, Agent, or Firm*—Glenn Patent Group; Michael A. Glenn

(57) ABSTRACT

Traditional techniques for data reception in burst-mode receivers are of significant complexity. To aid detection, most burst-mode systems transmit a preamble, or predetermined data pattern, at the start of each new block of data. Using current methods, the detection of a new preamble, indicating the arrival of a new burst of data, is particularly complex. A method and apparatus is disclosed that significantly reduces this detection complexity, while maintaining superior signaling performance. This simplification can lead to higher data throughput within processing-limited receivers, and/or a greater degree of parallelism in multiple channel receivers.

18 Claims, 3 Drawing Sheets

U.S. PATENT DOCUMENTS

| | | |
|---|---|---|
| 6,819,282 B1 | 11/2004 | Galati et al. |
| 6,892,083 B2 | 5/2005 | Shostak |
| 6,934,327 B1 | 8/2005 | Whited et al. |
| 7,020,492 B2 * | 3/2006 | Doi et al. .................. 455/562.1 |
| 7,027,987 B1 | 4/2006 | Franz et al. |
| 7,113,981 B2 | 9/2006 | Slate |
| 2001/0019604 A1 | 9/2001 | Joyce |
| 2002/0015480 A1 | 2/2002 | Daswani |
| 2002/0049535 A1 | 4/2002 | Rigo |
| 2002/0106065 A1 | 8/2002 | Joyce |
| 2002/0146015 A1 | 10/2002 | Bryan |
| 2003/0028380 A1 | 2/2003 | Freeland |
| 2003/0033152 A1 | 2/2003 | Cameron |
| 2003/0065427 A1 | 4/2003 | Funk |
| 2003/0068154 A1 | 4/2003 | Zylka |
| 2003/0073434 A1 | 4/2003 | Shostak |
| 2004/0077334 A1 | 4/2004 | Joyce |
| 2004/0100898 A1 | 5/2004 | Anim-Appiah et al. |
| 2004/0110472 A1 | 6/2004 | Witkowski |
| 2004/0127241 A1 | 7/2004 | Shostak |
| 2004/0132433 A1 | 7/2004 | Stern |
| 2005/0143139 A1 | 6/2005 | Park |
| 2005/0144251 A1 | 6/2005 | Slate |
| 2005/0170863 A1 | 8/2005 | Shostak |
| 2006/0018440 A1 | 1/2006 | Watkins |
| 2006/0050686 A1 | 3/2006 | Velez-Rivera |
| 2006/0085521 A1 | 4/2006 | Sztybel |
| 2006/0206339 A1 | 9/2006 | Silvera |
| 2006/0206340 A1 | 9/2006 | Silvera |

FOREIGN PATENT DOCUMENTS

| | | |
|---|---|---|
| EP | 1003018 | 5/2005 |
| EP | 1633150 | 3/2006 |
| EP | 1633151 | 3/2006 |
| EP | 1742437 | 1/2007 |
| WO | WO00/16568 | 3/2000 |
| WO | WO00/21232 | 4/2000 |
| WO | WO01/22112 | 3/2001 |
| WO | WO01/22249 | 3/2001 |
| WO | WO01/22633 | 3/2001 |
| WO | WO01/22712 | 3/2001 |
| WO | WO01/22713 | 3/2001 |
| WO | WO01/39178 | 5/2001 |
| WO | WO01/57851 | 8/2001 |
| WO | WO02/07050 | 1/2002 |
| WO | WO02/11120 | 2/2002 |
| WO | WO02/17090 | 2/2002 |
| WO | WO02/097590 | 12/2002 |
| WO | WO2004/021149 | 3/2004 |
| WO | WO2004/077721 | 9/2004 |
| WO | WO2005/079254 | 9/2005 |
| WO | WO2006/029269 | 3/2006 |
| WO | WO2006/033841 | 3/2006 |
| WO | WO2006/098789 | 9/2006 |

* cited by examiner

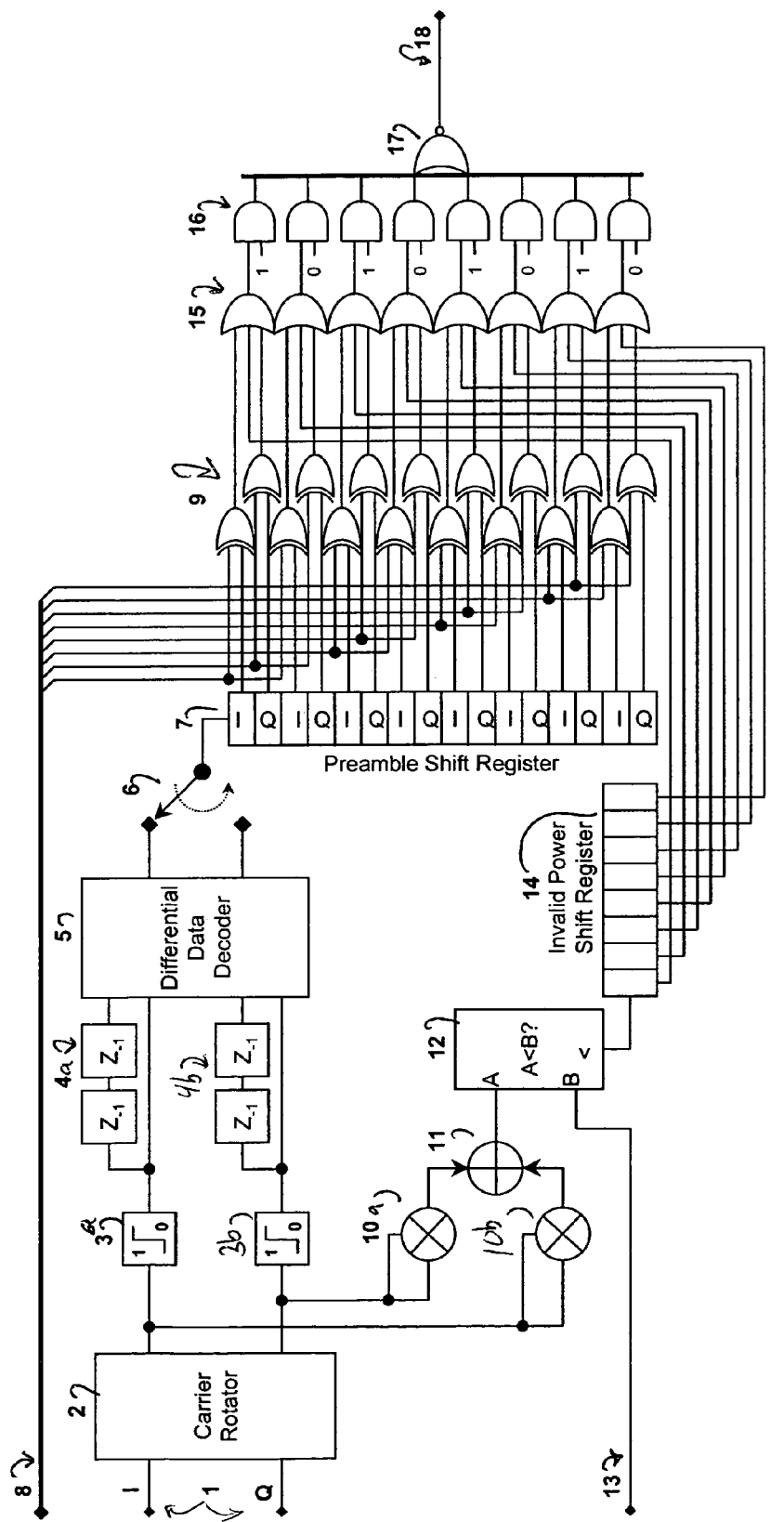

METHOD AND APPARATUS FOR EFFICIENT PREAMBLE DETECTION IN DIGITAL DATA RECEIVERS

CROSS-REFERENCE TO RELATED APPLICATIONS

This application claims priority to the U.S. Provisional Application No. 60/504,171 filed Sep. 18, 2003,all of which is incorporated herein in it's entirety by this reference thereto.

BACKGROUND OF THE INVENTION

1. Technical Field

The invention relates to digital communications. More particularly, the invention relates to a method and apparatus for efficient preamble detection in digital data receivers.

2. Description of the Prior Art

Data communications systems may generally be grouped into two basic forms: continuous data communications systems, and discontinuous, or burst data communication systems. In burst systems, a block of data is sent over a finite period of time, and then transmission is halted until a later point in time. To aid in the recovery of data bursts, most burst-mode systems use a preamble, which is a predefined data pattern that is sent prior to the data to be communicated. It is well understood that the efficiency of detecting this unique preamble pattern is of utmost importance because the complexity of preamble detection has a major impact on overall receiver complexity. The invention described herein is concerned with identifying a reduced-complexity method of preamble detection in burst-mode data transmission systems.

Another method of classifying data communications is between synchronous and asynchronous communications systems. In synchronous systems, the transmitter and the receiver use some means to communicate symbol timing information, in addition to the data to be transmitted. Because the addition of symbol timing information necessarily mandates increased channel bandwidth, many data communications systems use asynchronous data communication. In an asynchronous system, the receiver must perform symbol timing recovery to identify the optimum signal phase at which to recover the received data. The invention herein disclosed focuses upon asynchronous burst-mode systems.

A wide variety of modulation techniques have been created to communicate digital data asynchronously. One of the most commonly used is known as Quadrature Phase Shift Keying, or QPSK. In QPSK and its variants, two bits of information are transmitted every symbol interval. Changes in the phase of the transmitted signal are used to communicate information. This is performed by modulating two independent waveforms, historically known as I and Q, onto a single carrier. FIG. 1a shows a representative constellation diagram of a transmitted QPSK signal, where the I and Q axes are plotted together to demonstrate how two bits of information represent four distinct signal phase states in QPSK. To recover this signal, a receiver must estimate which of the four phases was transmitted during each symbol interval. To prevent interference between the two modulating waveforms, a 90-degree fixed phase shift is introduced between I and Q during the modulation process. This phase shift makes it possible to recover the I and Q information independently, despite the use of a single transmission carrier. Throughout this document, QPSK modulation is used as an example to illustrate the core concept of the invention, but the concept may be applied to a wide variety of different modulation formats.

In any asynchronous communications system that uses carrier-based modulation such as QPSK, there is an incommensurate relationship between the frequency of the transmitted carrier and the frequency of the receiver. Physical component limitations always lead to a finite frequency error between the two devices. FIG. 1b shows the consequence of a typical frequency error. As indicated, the constellation diagram actually rotates over time, making it more difficult for the receiver to identify the signal phase that was actually transmitted properly.

There are two primary techniques to correct for the signal impairment that is caused by frequency error. In the first method, the receiver performs carrier frequency/phase recovery to correct for the rotation prior to making a symbol decision. Receivers that use this technique are said to use coherent detection. In the second method, the absolute phase of the received signal is deemed to be irrelevant. The transmitter instead performs differential encoding to allow the relative phase difference between sequential symbols to convey information. Receivers that rely solely upon differential phase to recover the transmitted signal phase are said to use differential detection. Note that it is possible for a receiver to use both of these methods simultaneously. If so, the result is known as coherent detection of a differentially encoded signal. This combination is very commonly used because the process of performing carrier recovery on a QPSK signal inevitably leads to a 90 degree phase uncertainty. The carrier recovery logic in a coherent receiver can lock on to any of four different absolute signal phases. By using differential encoding, the absolute phase ambiguity is irrelevant because only relative phase changes encode signal information.

Once a receiver has completed preamble detection, symbol timing recovery and carrier frequency/phase recovery, it then must demodulate the incoming signal to transform it from a waveform representation into digital data bits. As mentioned previously, this entails identifying which of the four possible QPSK waveform states were most likely sent by the transmitter during each symbol interval. During demodulation, the I and Q waveform values are often treated as a single complex number, and hence may be plotted as shown in FIG. 1a in constellation diagram form, with I and Q forming the real and imaginary components of the input sample values.

The theoretically optimum technique for coherent demodulation of a QPSK signal performs a Euclidean distance search between the complex received sample values and each of the four ideal QPSK states. The QPSK state having the shortest distance to the sample value is declared to be the received symbol value. For efficiency, most QPSK systems incorporate a fixed 45-degree rotational offset for the four ideal phase points, such that the QPSK signaling states are located at phases of 45 degrees, 135 degrees, 225 degrees, and 315 degrees. In this case, the complex Euclidean distance search may be replaced with a simple sign() comparison for the I and Q values.

In the case of pure differential detection, the theoretically optimum demodulation technique multiplies the complex received sample values by the complex conjugate of the signal as delayed by one symbol time. The resulting product represents a differential phase sample that indicates the relative phase from the previous symbol to the current symbol. Stated more precisely, given an input sample stream $R_k$, the complex differential phase sample $Z_k$ is computed as:

$$Z_k = R_k \cdot R^*_{k-N} \tag{1}$$

where N is the number of samples that are acquired by the receiver per symbol time, and $R^*_{k-N}$ is the complex conjugate of the previous symbol's sample value. Note that this phase sample may also be considered a vector, with the (0,0) origin as the assumed initial endpoint. Once the differential phase vector has been computed, four separate complex derotations, corresponding to the negative value of the four ideal QPSK phases, are performed in parallel upon $Z_k$. The ideal phase derotation that results in the greatest positive magnitude is selected as the current symbol value (for example, see D. Divsalar, M. Simon, *Multiple-Symbol Differential Detection of MPSK*, http://d1.comsoc.org/cocoon/comsoc/servlets/GetPublication?id=147684; FIG. 1). As with coherent detection, more efficient techniques are commonly used which obviate this degree of complexity. Given a complex differential phase vector $Z_k$, one such technique is:

$$x=\text{sign}(\text{real}(Z_k)+\text{imag}(Z_k)) \quad (2)$$

$$y=\text{sign}(\text{real}(Z_k)-\text{imag}(Z_k)) \quad (3)$$

Depending on the signaling convention used by the specific implementation, the values of x and y correlate directly with the two data bits that underlie each symbol's QPSK state, yielding two bits of recovered information per symbol time.

It is important to point out one additional processing step that is performed by nearly all burst receivers, and that is the computation of the received signal's input power level. Signal power is important for many reasons for example, some devices display the signal power in the form of a logarithmic received signal strength indicator, while others compute the Signal/Noise Ratio of a signal as a quality metric by following the well-known power formula:

$$SNR(dB)=10*\log_{10}((\text{Signal Power})/(\text{Noise Power})) \quad (4)$$

where the signal power S and noise power N levels are computed by:

$$\text{power}_k=\text{real}(R_k)^2+\text{imag}(R_k)^2 \quad (5)$$

Most burst mode receivers also require some form of signal power estimation during preamble detection. Without knowing the power level of the received signal, random noise may frequently yield false-positive preamble detection. While this is not harmful in and of itself, falsely triggering on noise can mask the start of subsequent data bursts, leading to a loss of valid data bursts. For this reason, signal power estimation is a very important element of most burst-mode data receivers.

It would be advantageous to provide a method and apparatus for efficient preamble detection in digital data receivers.

SUMMARY OF THE INVENTION

The presently preferred embodiment of the invention described herein describes new, highly-efficient approach to preamble detection. Beginning with an efficient implementation of a coherent preamble detector, an efficient differential preamble detector is described that is ideally suited for rapid burst detection. As a component of the invention, a new modulation power estimator is disclosed that can avoid the need for conventional power estimation. The invention applies both to hardware and software implementations, and can increase data throughput in existing processing-limited receivers, and/or increase the number of channels that may be supported in multiple-channel receiver implementations. Furthermore, extensions to other modulation formats, such as generalized MPSK or QAM, are apparent to those skilled in the state of the art. Thus, the inventive preamble detection mechanism herein described has broad potential applicability.

BRIEF DESCRIPTION OF THE DRAWINGS

FIG. 2 is a block schematic diagram that illustrates an efficient implementation of a coherent preamble detector for QPSK according to the invention.

DETAILED DESCRIPTION OF THE INVENTION

Figure 1B:
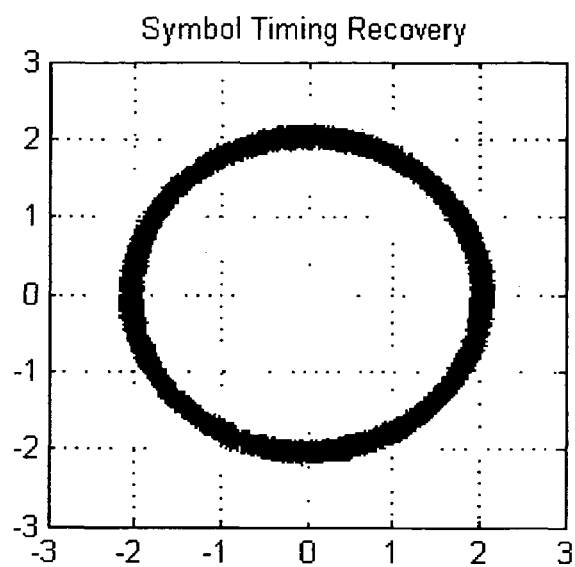
FIG. 1b shows the consequence of a typical frequency error.
Figure 1A:
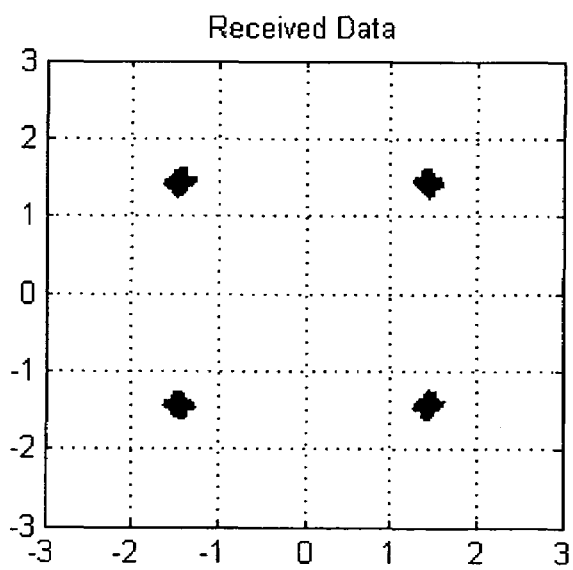
FIG. 1a shows a representative constellation diagram of a transmitted QPSK signal, where the I and Q axes are plotted together to demonstrate how two bits of information represent four distinct signal phase states in QPSK.

To illustrate a presently preferred embodiment of the invention, FIG. 2 depicts an efficient implementation of a coherent preamble detector for QPSK. In FIG. 2, two samples per symbol interval are used. In FIG. 2, the digitized input I and Q samples 1 represent the reconstructed base band form of QPSK modulation. Carrier derotation block 2 aligns the incoming signal phases with the I and Q axes (controlled by means that are not relevant here), thus defining this as a coherent detector. Note, however, that no assumptions are made about symbol timing recovery.

Sign blocks 3a and 3b produce a '1' if the I and Q samples are greater than or equal to 0, or a '0' if the samples are less than 0, implementing coherent detection. Sample delay blocks 4a and 4b provide chains of N-sample delays, to yield one symbol-length delay for both I and Q. A differential decoder 5 combines the current symbol state with the prior symbol state to yield a differentially decoded symbol value. This decoder is typically implemented as a 16×2 bit lookup table in hardware, or as a 16-byte lookup table in software. The four inputs of the lookup table comprise two bits each from the current symbol and the previous symbol, and the output is a differentially decoded current symbol. A multiplexer 6 alternates between the least-significant and the most-significant bit of the differentially decoded symbol values, thus the binary data bits are clocked into a preamble shift register 7 at two bits/sample. The preamble shift register 7 therefore contains a serial-sequential representation of the received data stream. Because two samples are occurring per symbol, the length of shift register 7 is twice the number of bits in the preamble.

Conceptually, to locate a unique preamble data pattern using this shift register, the following expression may be used:

$$\text{Preamble\_Mismatch}=\text{Preamble\_Register XOR PREAMBLE\_PATTER} \quad (6)$$

where the PREAMBLE_PATTERN 8 is a bit-pair doubled representation of the unique data pattern that defines the implementation-specific value for the preamble. For example, a preamble data pattern of binary '0011001 1' would yield a PREAMBLE_PATTERN of '0000111100001111000011111'. Preamble_Mismatch indicates the outputs of the XOR gates 9. These gates invert any bits in the preamble that should be a binary '1.' When the outputs of the XOR gates 9 all become zero, indicating no mismatch, a data pattern has been identified that matches the desired preamble data pattern.

Next, it is necessary to implement a power estimation function. For this first preamble detector implementation, the power is computed using the traditional power function real $(R_k)\cdot\text{real}(R_k)+\text{imag}(R_k)\cdot\text{imag}(R_k)$. The multipliers 10a and 10b and the adder 11 compute the signal power. The signal power level is then compared by the comparator 12 to a predetermined minimum acceptable power threshold 13. The power threshold 13 may be fixed, or it may be a variable threshold that is determined by other means that are related to recent noise or interference power levels. The output of the comparator 12 is a '1' if the input signal level is too low to be considered a valid transmission, and it is '0' if the power level exceeds the threshold. The output feeds the shift register 14, i.e. the Power_invalid shift register, which contains a history of the invalidity status of recent samples.

To merge the Power_Invalid flags with the Preamble_Mismatch outputs, OR gates 15 effectively result in a product expression of:

Preamble_Status=Preamble_Mismatch OR Power_Invalid (7)

This effectively ensures that a candidate preamble has both the proper bit polarity, and the proper signal level. In addition, the OR gates 15 combine the I and Q data bits such that if either the I or Q samples has the incorrect signs, then the output of that sample's OR gate becomes true to indicate a non-matching symbol.

Thus far, no assumption has yet been made about the timing of the incoming samples with respect to the transmitted waveform, i.e. symbol timing recovery has been ignored. The two samples that are acquired per symbol interval may occur at any pair of signal phases that are offset from one another by 180 degrees. If the even signal samples are in approximate time-alignment with the transmitter, then the odd signal samples are exhibiting zero-crossings, and the odd outputs are not predictable. Alternately, if the odd signal samples are in approximate time-alignment with the transmitter, then the even sample outputs are not predictable. To resolve this problem, the AND gates 16 isolate N-1 out of N samples to ignore one sample/symbol during which zero-crossings may occur. With two samples/symbol, the AND gates 16 isolate alternate samples.

Once all of the relevant samples have the proper signs, and have been received with a sufficient power level, the output of the NOR gate 17 is driven high, indicating Preamble_Found 18. At this point, the receiver begins the process of receiving the new data burst.

For clarity of presentation, FIG. 2 contains several non-optimal circuit elements. As is apparent, the fixed AND gates 16 are not necessary in a hardware implementation of this preamble detector, though this function is appropriate for software-based parallel implementations. As a consequence, the AND gates 16 may be replaced with direct-wired connections to the NOR gate 17, which thereby requires only four inputs in this example. Similarly, four OR gates 15 and eight XOR gates 9 may also be removed in the case of a two sample/symbol preamble detector.

It is possible to use this preamble detector with any integer number of samples/symbol, or any preamble length by extending the Shift Registers 7 and 14, coupled with the appropriate number of XOR gates 9, OR gates 15, and AND gates 16, and inputs to the NOR gate 17. In any of these implementations, if the preamble used is an unchanging constant, then the XOR gates 9 may be eliminated, and NOT gates may be inserted selectively at any sample timing offset where the expected value of the preamble is '1.'

The embodiment of the invention illustrated by FIG. 2 demonstrates an important efficiency improvement because it yields a preamble detector which functions in the absence of any symbol timing recovery information. However, it still requires carrier timing recovery to be performed, and that is problematic. In a burst-mode receiver, the challenge is that no such information is typically available at the start of a new burst of data. Each new burst typically has a unique symbol timing offset, as well as a unique carrier frequency and phase offset. The logic of FIG. 2 is fully functional, but it requires that a block-based method of carrier recovery be implemented. In such a method, the entire burst of data is received, and a means is used to examine the received data in a first pass to determine the initial carrier phase and carrier rotation rate. Thereafter, a second pass is made through the data, at which time the estimated carrier derotation is applied to the data, and the logic of FIG. 2 may be invoked.

Further Simplification

Throughout the following discussion, it will be assumed that the architecture of the receiver uses integer numeric representation (typically signed binary numbers), rather than floating point representation. This not only simplifies analysis, it is also representative of the majority of receiver implementations.

To identify opportunities for complexity reduction, it is helpful to examine a typical differential encoding scheme for QPSK data. To communicate a new symbol $S_k$, the transmitter selects a new relative carrier signal phase $T_k$ based upon the following:

| Symbol Value $S_k$ | Phase change, $T_{k-N}$ to $T_k$ |
| --- | --- |
| 0 | No phase change |
| 1 | +90 degrees |
| 2 | −90 degrees |
| 3 | +180 degrees |

Based upon this encoding, it is not surprising that the majority of documented systems use antipodal symbols to comprise the preamble, i.e. symbol values that are diametrically opposed to one another on the constellation diagram. Specifically, most QPSK preambles are comprised of various sequences of the symbol values 0 and 3, yielding phase changes of 0 degrees and 180 degrees. Furthermore, to simplify signal detection, $T_0$ is usually defined as an assumed phase of +45 degrees, or as +225 degrees. These initial phase points are chosen so that the I and Q waveform components of the transmitted signal simultaneously transition from a peak negative amplitude to a peak positive amplitude, or from a peak positive amplitude to a peak negative amplitude. This effectively aligns the preamble's antipodal symbol transitions with the signs of the coordinate axes. While the selection of antipodal symbols is normally made for reasons that are related to the bit error rate, this introduces an important opportunity for efficiency improvement.

Consider the first step in differential demodulation, which is to multiply a sample $R_k$ by the complex conjugate of sample $R_{k-N}$, yielding differential phase sample $Z_k$. When expanded, this formula becomes:

$\text{real}(Z_k)=\text{real}(R_k)\cdot\text{real}(R_{k-N})-\text{imag}(R_k)\cdot-\text{imag}(R_{k-N})$
$\text{imag}(Z_k)=\text{real}(R_k)\cdot\text{imag}(R_{k-N})+\text{imag}(R_k)\cdot\text{real}(R_{k-N})$ (8)

Removing the double negation from the computation of real($Z_k$) yields:

$\text{real}(Z_k)=\text{real}(R_k)\cdot\text{real}(R_{k-N})+\text{imag}(R_k)\cdot\text{imag}(R_{k-N})$
$\text{imag}(Z_k)=\text{real}(R_k)\cdot\text{imag}(R_{k-N})+\text{imag}(R_k)\cdot\text{real}(R_{k-N})$ (9)

The expression for real($Z_k$) is particularly interesting in the context of antipodal signaling. Because this is a coherent detector, carrier rotator 2 has previously aligned the incoming I and Q sample values with the ideal state of the I and Q axes, with the exception of the previously-mentioned four-phase timing ambiguity. When the carrier detection loop has locked on to the improper signal phase, there are two potentially deleterious effects. First, at two of the three possible incorrect phase points, the signs of the I and/or Q samples are systematically incorrect. Second, at one possible phase offset, there is an apparent systematic swap of the I and Q values throughout the duration of the data burst.

Initially, to simplify the following analysis, the effects of channel non-linearity, noise, and potential error in the carrier frequency/phase recovery circuits are ignored. There are only two cases to consider during antipodal signaling. In the first, a 0-degree phase offset occurs between $R_{k-N}$ and $R_k$, and in the second, a 180 degree phase offset occurs. If a 0 degree phase offset is transmitted, by definition sample $R_{k-N}$ is equal to sample $R_k$. In this case, computing real($Z_k$) is identical to computing the power level of the incoming signal, whether the signal levels are positive or negative, because squaring two identical numbers necessarily yields a positive result. With a 180 degree phase offset, the signs of both the incoming I and Q samples are inverted between $R_{k-N}$ and $R_k$, but the absolute value of the magnitude of the I and Q components is otherwise unchanged. Consequently, in a perfect, coherent detection system, during antipodal signaling, the following is true:

$$\text{power}_k = abs(\text{real}(R_k) \cdot \text{real}(R_{k-N})) + abs(\text{imag}(R_k) \cdot \text{imag}(R_{k-N})) \quad (10)$$

Note the similarity between equation (10) and a restatement of the traditional power estimation function:

$$\text{power}_k = \text{real}(R_k) \cdot \text{real}(R_k) + \text{imag}(R_k) \cdot \text{imag}(R_k) \quad (11)$$

This parallel represents an important observation, for it indicates that the expensive computation of real($Z_k$) can directly yield a signal power estimate, via two inexpensive absolute value operations, and a single addition. For the purposes of differentiation from standard methods of computing power, this new formulation of signal power is referred to herein as modulation power.

Further examination of real($Z_k$) yields another interesting observation. During 0-degree phase shifts, real($Z_k$) is always a large positive number, and during 180 degree phase shifts, real($Z_k$) is always a large negative number. In other words, the sign of real($Z_k$) is entirely sufficient to differentiate between the 0-degree and 180-degree phase shifts that characterize antipodal signaling. It is therefore unnecessary to compute imag($Z_k$) because it yields no additional information beyond that of real($Z_k$). Consequently, it is possible to compute the differential phase sample $Z_k$ for antipodal symbols with one-half of the complexity that is typically required.

This reduction in phase detection to a single sign bit reduces storage requirements for the sequence of sample phases to one bit/sample. This shortens the length of preamble shift register 6 by one-half, and yields corresponding simplifications to the logic which follows it.

Figure 3:
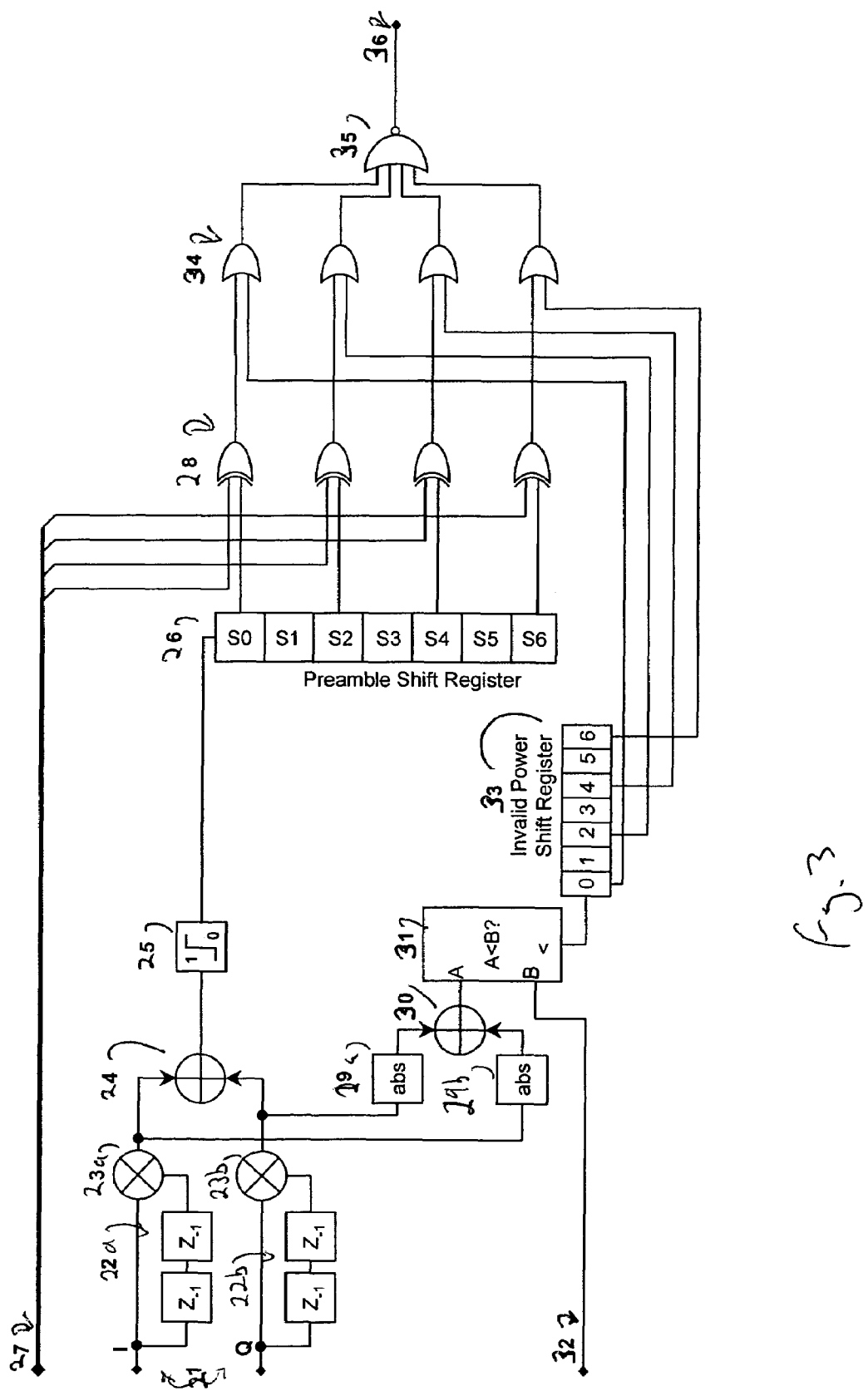
FIG. 3 is a block schematic diagram that depicts an enhanced implementation of the FIG. 2 preamble detector and, illustrates a reduction in complexity that is made possible by this implementation.

FIG. 3 depicts an enhanced implementation of the FIG. 2 preamble detector, and illustrates a reduction in complexity that is made possible. In addition to those simplifications that were previously discussed, the enhanced preamble detector shown in FIG. 3 uses the simplified phase detector and power estimator described herein.

As is illustrated in FIG. 3, significantly reduced complexity results from these transformations. Starting with I and Q samples 21, delay blocks 22*a* and 22*b* yield one-symbol delayed versions of both signals. Multipliers 23*a* and 23*b* compute the partial products of the I and Q samples and the complex conjugate of the delayed signal, yielding the real and imaginary components of real($Z_k$). An adder 24 sums these phase components to yield a differential phase sample real ($Z_k$). A sign block 25 produces the differential phase bit that flags 0-degree relative phase shifts with a '1,' and 180-degree samples with a '0.' These phase bits are sequentially clocked into a preamble shift register 26 in the form of a serially-concatenated phase sequence. The nominal preamble phase sequence 27 is exclusive-ORed with the receive phase sequence by XOR gates 28. As a minor efficiency enhancement, note that the preamble phase sequence 27 is inverted in this implementation, such that a preamble data pattern of binary 00110011 is represented by the phase bit sequence 1010 instead of 0101.

Power estimation in the preamble detector of FIG. 3 is derived from the same differential phase components that are used for phase detection. The absolute value operators 29*a* and 29*b* force these phase components to be positive, and the adder 30 sums them to create a received signal power estimate. The comparator 31 compares the power estimate with the minimum power level 32 necessary for a sample to be considered a valid received signal. As with the preamble detector of FIG. 2, the sequence of power invalidity states are clocked into the invalid power shift register 33, corresponding to one bit per received sample. When a signal sequence has been received which contains the minimum necessary power, and with the correct sample phases, the outputs of the OR gates 34 are all low. The NOR gate 35 detects this condition, and outputs a high level at the preamble detection output 36, flagging the presence of a new data burst.

Of all the simplifications implemented in FIG. 3, note in particular that Carrier Rotation block 2 from FIG. 2 is no longer present. This is particularly significant because the FIG. 3 preamble detector is no longer a coherent preamble detector. Rather, it is a differential preamble detector. In fact, this enhanced efficiency preamble detector needs neither carrier frequency/phase recovery nor symbol timing recovery to function. To understand its basis in this context, it is necessary to review the operation of the detector in the presence of a carrier error, i.e. while the received signal constellation is rotating.

Because all elements of this preamble detector are derived from the components of $Z_k$, it is sufficient to consider the effect of a rotating constellation on the computation of $Z_k$. The definition of QPSK signaling states that, in the absence of carrier rotation, the magnitude of received signal components I and Q each alternate between:

$$+/- \text{scale} \cdot \text{sqrt}(2)/2 \quad (12)$$

where scale is an arbitrary gain value that permits representation of the received signal components in integer form. This factor changes dynamically with changing channel conditions, but may be considered to be a nominal fixed value throughout the duration of an individual symbol. Further, consider initially that the degree of carrier rotation is constant during an individual symbol, such that there exists a unique arbitrary carrier phase offset for each received symbol. In the case of antipodal signaling, modulation power is indistinguishable from conventionally measured power, regardless of the carrier phase. This outcome is not unexpected because, by definition, the absolute magnitude of a transmitted QPSK signal remains constant at all carrier phases as long as it is sampled at the proper symbol timing phase. In the absence of symbol timing recovery, the received power level necessarily varies as zero-crossings occur, but this is as true for conventionally determined power as it is for modulation power.

In the event of a significant carrier frequency error, where the ideal symbol phase slowly rotates each symbol interval, modulation power yields a slight reduction in the estimated power level. The degree of reduction is proportional to the degree of carrier frequency error. For most applications, the error in the modulation power estimate caused by carrier error is inconsequential. For very large carrier errors, QPSK bit error rates rise quickly in the absence of hardware carrier recovery. Therefore, signal power estimation of a base band signal with high carrier frequency error is unlikely to be a performance-limiting factor.

For simplicity of presentation, the discussion thus far has focused solely on antipodal signaling. Incorporating non-antipodal signaling, e.g. symbol values of '1' and '2,' potentially results in a wider range of possible modulation power levels. Given any specific received symbol value, the antipodal symbols have already been discussed. Thus, the question arises of what power estimate is generated during relative symbol phases of +90 and −90 degrees. In a coherent receiver, the modulation power estimator produces results that are essentially identical to conventionally measured power for both antipodal and non-antipodal symbols. However, in differential receivers, the magnitude of the modulation power estimate for non-antipodal symbol transitions varies dependent upon carrier phase error.

Simulation of non-antipodal signaling in the presence of carrier error yields a mean expected modulation power level of approximately 0.6365 times conventional power measurement. Including both antipodal and non-antipodal symbols, a random sequence of QPSK symbols yields a gain calibration factor of approximately 1.222. After calibration, which need only be performed once per data burst, the modulation power estimator may replace conventional signal power measurement for many applications that involve pseudo-random transmitted data. Because many, if not most, data transmission systems already use some form of randomization to improve system performance, the modulation power estimator has broad potential applicability.

The introduction of noise into the received signal does yield a slight divergence between conventional power and modulation power, but over the length of a data burst, modulation power converges with conventional power to only a small degree of error. If increased accuracy is required, simulation may be used to create a simple linear correction factor that reduces the error. Importantly, the specific calibration factor is independent of the signal/noise ratio or the received power level, and is dependent only upon the spectral characteristics of the noise, and the number of samples that are incorporated in the measurement. Consequently, modulation power may be used in most calculations that require a signal power estimator, including preamble threshold detection, absolute signal strength, or the received signal/noise ratio.

Signaling Performance

Thus far, the means have been disclosed to create a high-efficiency preamble detector, but no assessment has yet been made of the signaling performance of the resulting subsystem. In particular, it is well known that coherent QPSK demodulation outperforms differential QPSK demodulation by 2-3 dB. That is, for an equivalent system bit error rate, a coherent detector can function with a 2-3 dB lower Signal/Noise ratio. Therefore, the choice of differential detection may appear to have introduced performance degradation into the selected preamble detector. Surprisingly, the core methodology outlined herein of using $real(Z_k)$ for phase detection of antipodal signaling actually outperforms theoretically perfect coherent demodulation of random QPSK data by 3 dB, assuming proper symbol timing recovery. This unexpected outcome may be understood by realizing that during antipodal signaling, the I and Q waveform components reinforce one another. For an error to occur, the amplitude of a noise peak must necessarily be twice as large to result in a sign change of the summed I and Q phase components, as compared to non-antipodal signaling. Alternately, antipodal signaling during a preamble may be viewed as a halving of the transmitted bandwidth because the I and Q components carry identical information. Consequently, a 3 dB gain is to be expected.

However, for efficiency purposes, the preferred implementation of the preamble detector does not perform symbol timing recovery. Instead, a binary mask is used to remove those samples that are performing zero-crossings. In this context, it is apparent that a signal that exhibits either a 0-degree or 180-degree symbol timing offset from the transmitter yields the full 3 dB of improvement over a traditional coherent QPSK data detector. From examination of the square-root raised cosine pulse shape that is most commonly used for data transmission systems, it becomes clear that a worst-case reduction in the amplitude of $real(Z_k)$ using this masking approach in a two sample/symbol receiver occurs at a symbol timing error of +/−90 degrees. In this case, the amplitude of $real(Z_k)$ is precisely one-half of the amplitude without symbol timing error. Because a 50% reduction in signal amplitude is equivalent to a 3 dB loss, this indicates that the worst-case performance of this differential preamble detector exactly matches the theoretical performance of a coherent demodulator. Integration over all possible symbol timing offsets yields a mean expected amplitude for $real(Z_k)$ that is approximately 1.786 times higher than that of an individual I or Q component, resulting in a net signal/noise ratio improvement of 2.5 dB over a theoretically perfect coherent QPSK detector for random QPSK data. Realistically, this means that the preferred implementation always outperforms the QPSK data demodulator that follows it, whether it is a coherent detector, or a differential detector. In other words, the selected architecture does not introduce any meaningful performance degradation.

While not revealed previously, the initial implementation of the disclosed invention is in a multi-user transmission system, where multiple transmitters share a common transmission frequency. The frequency is shared via time-multiplexing the data bursts from the individual transmitters. In this specific implementation, no carrier sense mechanism is used by the transmitters to detect when the shared frequency is already in use, leading to collisions where the data bursts from different transmitters sometimes overlap. This environment places an even greater burden upon the preamble detection system. Unlike single-user systems, in a multi-user system it is possible to encounter full-power random data transmission immediately following a collision. When this occurs, the preamble detector must differentiate between all four QPSK states, rather than benefiting from the known structure of antipodal preamble signaling preceding each data burst. Consequently, it may appear as though the computation of a single phase vector $real(Z_k)$ in place of the full complex phase vector $Z_k$ would yield performance deterioration. However, consider again the formula for the imaginary component of $Z_k$:

$$imag(Z_k) = real(R_k) \cdot imag(R_{k-N}) + imag(R_k) \cdot real(R_{k-N}) \quad (13)$$

While it was previously postulated that removal of imag(Zk) was possible for the detection of antipodal signaling, this is now examined in more detail. In the absence of noise, the value of $imag(Z_k)$ during antipodal signaling has a small amplitude relative to $real(Z_k)$. Conversely during non-antipodal signaling, the value of $imag(Z_k)$ alternates between a large positive and large negative amplitude, while the value of $real(Z_k)$ has a small relative amplitude. Therefore, even when the enhanced efficiency preamble detector encounters truly random QPSK data containing both antipodal and non-antipodal symbols, the power threshold detection means ensures that non-antipodal signal transitions are not incorrectly identified as valid antipodal preamble transitions. In both single-user and multi-user environments, the proposed preamble detector properly differentiates antipodal preamble symbol transitions.

Exemplary Preamble Detector

The following is a code listing of the logic for a preamble detector used in a high-density return path receiver. The listing is provided for purposes of example and is for use with the MIPS family of processors.

```
1                    # 1 "preamble.S"
2                         .psize 82
1                         .psize 82
2
3      /******************************************************/
4      /*                                                    */
5      /*   ----------------------------------------------- */
6      /*----------- H D - R P R   P R E A M B L E   D E T E C T I O N -----------*/
7      /*   -----------------------------------------       */
8      /*                                                    */
9      /*                                                    */
10     /*              Author: Mark J. Foster                */
11     /*                                                    */
12     /*                                                    */
13     /******************************************************/
14
15     /******************************************************/
16     /* PREAMBLE.S:                                        */
17     /*                                                    */
18     /*This module contains the preamble detection logic for the High-Density */
19     /* Return Path Receiver. This code scans received sample blocks for the */
20     /*distinctive data pattern which indicates the start of a new cell. As noted */
21     /*below, this routine utilizes non-differential decoding of the cell preamble./
22     /*                                                    */
23     /* Entry Points:                                      */
24     /*                                                    */
25     /* Detect_Preamble: Initiate preamble detection for the first block of*/
26     /*               data following a previous cell.      */
27     /* Detect_Preamble_Next: Continue scanning for a preamble in subsequent */
28     /*               data blocks.                         */
29     /******************************************************/
30
31     /******************************************************/
32     /*                 I N C L U D E   F I L E S          */
33     /******************************************************/
34          #include "channel.h"        /* Load the CHANNEL structure definition */
1      /******************************************************/
2      /*                 C H A N N E L   S T R U C T U R E  */
3      /******************************************************/
4          #define preamble     (0*8)      # Currently decoded preamble bit field: UINT64
5          #define powerstat    (1*8)      # Currently decoded power status: UINT64
6          #define noisepwr     (2*8)      # Summation of noise power: PSFLOAT(Real,Imag)
7          #define sigpwr       (3*8)      # Summation of signal power: PSFLOAT(Real,Imag)
8          #define threshold    (4*8)      # Threshold value for acceptable pwr: PSFLOAT
9          #define symbol_1     (5*8)      # Previously received symbol value as PSFLOAT
10         #define sample_1     (6*8)      # Previously received input sample: PSFLOAT
11         #define sample_2     (7*8)      # Sample before previous sample: PSFLOAT
12         #define sample_3     (8*8)      # Sample before sample_2: PSFLOAT
13         #define sample_4     (9*8)      # Sample before sample_3: PSFLOAT
14         #define pwr_0        (10*8)     # Power summation of cell at phase 0: PSFLOAT
15         #define pwr_90       (11*8)     # Power summation of cell at 90 deg: PSFLOAT
16         #define pwr_180      (12*8)     # Power summation of cell at 180 deg: PSFLOAT
17         #define pwr_270      (13*8)     # Power summation of cell at 270 deg: PSFLOAT
18         #define shiftcnt     (14*8)     # Shift count: align RX data w/byte bound INT32
19         #define outbuff      (14*8+4)   # Pointer to output cell buffer: BYTE ptr
20         #define inbuff0      (15*8)     # Pointer to first input buffer
21         #define inbuff1      (15*8+4)   # Pointer to second input buffer
22         #define inbuff2      (16*8)     # Pointer to third input buffer
23         #define inbuff3      (16*8+4)   # Pointer to fourth input buffer
24         #define inbuff4      (17*8)     # Pointer to fifth input buffer
25         #define inbuff5      (17*8+4)   # Pointer to sixth input buffer
26         #define inbuff6      (18*8)     # Pointer to seventh input buffer
27         #define inbuff7      (18*8+4)   # Pointer to eighth input buffer
28             . . .
35
36          .set      noreorder      # Tell assembler to use exact sequence
37          .set      noat           # Ensure that the assembler doesn't use $1
38          .text                    # Begin code segment
39          #
40          # Paired-single version, using MIPS-3D extensions
41          #
42     0000 0000A4CC    pref      4,0($5)      # Do this at start of channel intr service
43     0004 2000A4CC    pref      4,32($5)
44     0008 4000A4CC    pref      4,64($5)
45     000c 6000A4CC    pref      4,96($5)
46
47
48
################################################################################
```

-continued

```
49          # Detect_Preamble: (SAMPLE *inbuff, int length)
50          # Detect_Preamble_Next: (SAMPLE *inbuff, int length)
51          #
52          #       ["Multi-threaded" paired-single detection loop: ~2.5 Clocks/component]
53          #
54       # Detect_Preamble is called to scan a channel for the distinctive pattern which
55       # indicates the start of a new cell. This routine utilizes several different
56          # methods to minimize execution time, including:
57          #
58          #    - Paired-single floating point values are used to allow for
59          #        parallel processing of Real and Imaginary components.
60          #
61          #    - Four Real+Imaginary sample pairs are processed in parallel,
62          #        by building a byte corresponding to these eight components,
63          #        then scanning for a preamble at the four possible preamble
64          #        start points within each byte.
65          #
66          #    - Non-differential detection is used in place of conventional
67          #        differential detection. This is necessary in order to
68          #        solve a "chicken and egg" problem: the symbol timing
69          #        detection method used by the HD-RPR requires knowledge of
70          #        packet boundaries, but differential detection requires
71          #        knowledge of symbol timing! While non-differential detection
72          #        of the cell preamble results in a slight reduction in SNR (a
73          #        few 10ths of a dB), the block-oriented symbol timing method
74          #        used for recovery of data following the preamble increases
75          #        signal/noise ratio performance far more than this slight loss.
76          #
77          #    - "Multi-threading", where samples from the previous pass through
78          #        the primary loop are processed in parallel with samples read
79          #        in the current pass. This is done by interleaving the code for
80          #        the first and second half of the detection loop together.
81          #
82          # Detect_Preamble works by building two parallel shift registers: one
83          # for the sign of each sample, and one which indicates the power level
84          # of each received sample. The routine works by ensuring that each
85          # sample of a "target" preamble not only matches the required data
86          # pattern, but also has a signal power level that exceeds a minimum
87          # signal strength, thereby minimizing false triggering from noise.
88          #
89          # To understand the preamble pattern which this routine scans for, consider
90          # that the data is differentially encoded, but will be non-differentially
91       #decoded. Since the data is QPSK encoded, two bits are transmitted per symbol.
92          # Each symbol has two components, known as 'I' and 'Q'. 'I' carries the
93          # even data bits, and 'Q' carries the odd data bits. In a non-differential
94          # decoder, the Real component of the waveform maps directly to I, and the
95          # Imaginary component of the waveform maps directly to Q. Since the Xilinx
96          # channelizer outputs samples as R,I,R,I,R,I..., and since this routine
97          # examines the real and imaginary components in parallel, sequential samples
98          # directly map to received data bits - a positive sample value is decoded as
99          # a '1', and a negative sample becomes a '0'. Per the DVS-178 standard, the
100         # standard 28-bit preamble pattern is:
101         #
102         #              CCCCCC0H = 1100110011001100110011000000B
103         #
104      #In differential modulation, a '11' pattern causes an inversion of the signal
105         # state. As a result, examining the data non-differentially yields:
106         #
107         #              F0F0F00H = 111100001111000011110000000B
108         #
109         # However, since individual set-top box transmitters are operating with
110         # arbitrary random clock phases, the symbols aren't necessarily aligned with
111         # the Xilinx output samples (in other words, no symbol timing recovery has
112      #yet been performed on the preamble samples). To handle this, Detect_Preamble
113      #applies a 'mask' which ignores samples at symbol transition boundaries where
114         # the data value changes. In terms of doubly-sampled symbols, this mask is:
115         #
116         #              EEEEEFEH = 1110111011101110111011111110B
117         #
118      #Since the data has real and imaginary components, each symbol occupies twice
119         # as many bits, so the actual mask value becomes:
120         #
121         #              FCFCFCFCFCFFFCH =
111111001111100111110011111100111111001111111111111100B
122         #
123      #Applying the mask to the double-sampled preamble data pattern results in the
124         # target data of:
125         #
126         #    FC00FC00FC0000H =
```

-continued

```
      1111110000000000111111000000000011111100000000000000000B
127         #
128         #After building a byte from four sequential real+imaginary sample pairs, the
129         # target data pattern and mask value are successively applied at the four
130         # possible shift offsets where a preamble can begin. Once a preamble is
131         # found, the routine computes the shift count which is used by the
132         # QPSK_Demodulate routine to byte-align demodulated data.
133         #
134     #In addition to scanning for cell preambles, this code also computes the powr
135             # level of incoming samples and sums them, making it possible for another
136             # routine to compute the background noise level. By coupling this with the
137     # signal power measurement made by QPSK_Demodulate, it is possible to estimate
138         # SNR measurements for each channel.
139         #
140         # There are two entries to this routine. Detect_Preamble is called to begin
141     # scanning for a preamble following initialization, or after a (previous) cell
142         # is received. For subsequent Xilinx blocks, Detect_Preamble_Next should be
143         # called.
144         #
145     # INPUT:
146     # $4:          Pointer to the current CHANNEL structure
147     # $5:          Pointer to the current input buffer, containing pairs of
148     #             INT32 sample components (R[x], I[x]). This buffer MUST be
149     #             aligned on 8 sample (64 byte) boundaries for proper shift-count
150     #             generation.
151     # $6:          Number of samples in input buffer; must be divisible by 8
152     #
153     # OUTPUT:
154     # $2:          Count remaining in buffer; 0 if preamble not found,
155     #             otherwise contains offset of the 8-sample block that contains
156     #             tail of the preamble.
157     #
158     # USES:
159     #             $1-$7, $10-$21
160     #             $f0-$f11
161         #
162         # !FIX!: Dynamic updates of threshold?
163
#################################################################################
164             detect_preamble:
165                 .ent          detect_preamble
166                 .globl        detect_preamble
167         #
168         # Initial entry point. This entry point is called following a cell being
169         # received, when it is time to make to begin scanning for a new preamble.
170         # This will clear the bit arrays used to track preamble detection status.
171         #
172     0010 0000A044    dmtc1     $0,$f0    # Clear sample number 0
173     0014 0008A044    dmtc1     $0,$f1    # Clear sample number 1
174     0018 0010A044    dmtc1     $0,$f2    # Clear sample number 2
175     001c 0018A044    dmtc1     $0,$f3    # Clear sample number 3
176     0020 2D004000    move      $0,$2     # Clear the received preamble after a cell
177     0024 07000010    b         decp1     # Start a new scan for a preamble, after..
178     0028 2D006000    move      $0,$3     # ..clearing the power status after a cell
179         #
180         # Alternate entry point, used for subsequent blocks of a cell. This entry
181         # loads the bit arrays which are produced as a result of scanning the prior
182         # block, which enables detection of preambles that cross block boundaries.
183         #
184         detect_preamble_next:
185             .globl        detect_preamble_next
186     002c 000002DC  ld    $2,preamble($4)    # Load the previous preamble status into $2
187     0030 080003DC  ld    $3,powerstat($4)   # Load previous power status into $3
188     0034 480000D4 ldc1  $f0,sample_4($4)   # Load previous sample value−4 from last call
189     0038 400001D4 ldc1  $f1,sample_3($4)#  Load previous sample value −3 from last call
190     003c 380002D4 ldc1  $f2,sample_2($4)#  Load previous sample value −2 from last call
191     0040 300003D4 ldc1  $f3,sample_1($4)#  Load previous sample value −1 from last call
192         #
193         # Common code. Load constant values for comparisons, including the mask
194         # and target values for preambles at four different bit offsets, as well
195         # as the 'noise power' counters used for measuring the background noise on
196         # each channel.
197         #
198     0044 200009D4 decp1: ldc1 $f9,threshold($4) #Load the p-s power threshold into $f9
199     0048 C0300600      sll    $6,3   # Multiply sample count to get byte count
200     004c 0040A044      dmtc1 $0,$f8  # Get paired-single floating point 0 in $f8
201     0050 100004D4      ldc1   $f4,noisepwr($4) # Read the current noise power value in $f4
202     0054 0028A044      dmtc1  $0,$f5         # Clear the second noise power counter
203     0058 0030A044      dmtc1  $0,$f6         # Clear the third noise power counter
```

-continued

| | | | | |
|---|---|---|---|---|
| 204 | 005c 0038A044 | dmtc1 | $0,$f7 | # Clear the fourth noise power counter |
| 205 | 0060 2138A600 | addu | $7,$5,$6 | # Compute byte address for end of buffer |
| 206 | 0064 00008EDF | ld | $14,pattern($28) | # Load the data match pattern for offset 0 |
| 206 | 00000000 | | | |
| 206 | 0800CE65 | | | |
| 206 | 2D70DC01 | | | |
| 206 | 0000CEDD | | | |
| 207 | 0078 000092DF | ld | $18,patmask($28)# Load pattern mask for offset 0 | |
| 207 | 00000000 | | | |
| 207 | 00005266 | | | |
| 207 | 2D905C02 | | | |
| 207 | 000052DE | | | |
| 208 | 008c BA780E00 | dsrl | $15,$14,2 # Generate data match mattern for offset 2 | |
| 209 | 0090 BA981200 | dsrl | $19,$18,2 # Generate pattern mask for offset 2 | |
| 210 | 0094 3A810E00 | dsrl | $16,$14,4 # Generate data match mattern for offset 4 | |
| 211 | 0098 3AA11200 | dsrl | $20,$18,4 # Generate pattern mask for offset 4 | |
| 212 | 009c BA890E00 | dsrl | $17,$14,6 # Generate data match mattern for offset 6 | |
| 213 | 00a0 BAA91200 | dsrl | $21,$18,6 # Generate pattern mask for offset 6 | |
| 214 | 00a4 FFFF0924 | subu | $9,$0,1 # Clear the 'preamble detected' status to −1 | |
| 215 | # | | | |
| 216 | # Begin by loading the next group of 4 input samples and converting them to | | | |
| 217 | # the paired-single floating point format. Simultaneously, determine if the | | | |
| 218 | # sample values from the prior pass meet minimum signal strength requirements. | | | |
| 219 | # | | | |
| 220 | 00a8 7C06C946 decp2: cabs.lt.ps $fcc6,$f0,$f9 #Check R0,I0 for minimum signal strength | | | |
| 221 | 00ac 0000A0D4 | ldc1 | $f0,0*8($5) | # Read next sample from inbuff: R0, I0 |
| 222 | 00b0 26008046 | cvt.ps.pw | $f0,$f0 | # Convert the sample into paired-single F.P. |
| 223 | 00b4 7C0CC946 | cabs.lt.ps | $fcc4,$f1,$f9 | # Check R1,I1 for minimum signal strength |
| 224 | 00b8 0800A1D4 | ldc1 | $f1,1*8($5) | # Read next sample from inbuff: R1, I1 |
| 225 | 00bc 66088046 | cvt.ps.pw | $f1,$f1 | # Convert the sample into paired-single F.P. |
| 226 | 00c0 7C12C946 cabs.lt.ps $fcc2,$f2,$f9 # Check R2,I2 for minimum signal strength | | | |
| 227 | 00c4 1000A2D4 ldc1 $f2,2*8($5) # Read next sample from inbuff: R2, I2 | | | |
| 228 | 00c8 A6108046 cvt.ps.pw $f2,$f2 # Convert the sample into paired-single F.P. | | | |
| 229 | 00cc 7C18C946 cabs.lt.ps $fcc0,$f3,$f9 # Check R3,I3 for minimum signal strength | | | |
| 230 | 00d0 1800A3D4 ldc1 $f3,3*8($5) # Read next sample from inbuff: R3, I3 | | | |
| 231 | 00d4 E6188046 cvt.ps.pw $f3,$f3 # Convert the sample into paired-single F.P. | | | |
| 232 | # | | | |
| 233 | # Next, compute the sum of the power of the input samples in parallel, in order | | | |
| 234 | # to be able to measure the "power" of the background noise on this channel. | | | |
| 235 | # At the same time, check to see if the samples from the prior pass match | | | |
| 236 | # the data pattern corresponding to a preamble, at four different sample | | | |
| 237 | # offsets (i.e. corresponding to four sequential sample periods). | | | |
| 238 | # | | | |
| 239 | 00d8 2601804C | madd.ps | $f4,$f4,$f0,$f0 # Compute power of sample 0 = R0^2, I0^2 | |
| 240 | 00dc 26504E00 | xor | $10,$2,$14 | # Determine if bits are in error for offset 0 |
| 241 | 00e0 26584F00 | xor | $11,$2,$15 | # Determine if bits are in error for offset 2 |
| 242 | 00e4 6609A14C | madd.ps $f5,$f5,$f1,$f1 # Compute power of sample 1 = R1^2, I1^2 | | |
| 243 | 00e8 26605000 | xor | $12,$2,$16 | # Determine if bits are in error for offset 4 |
| 244 | 00ec 26685100 | xor | $13,$2,$17 | # Determine if bits are in error for offset 6 |
| 245 | 00f0 A611C24C | madd.ps | $f6,$f6,$f2,$f2 # Compute power of sample 2 = R2^2, I2^2 | |
| 246 | 00f4 381A0300 | dsll | $3,8 | # Shift power status register to make room |
| 247 | 00f8 E619E34C | madd.ps | $f7,$f7,$f3,$f3 # Compute power of sample 3 = R3^2, I3^2 | |
| 248 | 00fc 00C84144 | cfc1 | $1,$25 # FCCR # Read power results to determine valid bits | |
| 249 | # | | | |
| 250 | # Decode the sample values received on this pass by comparing the values to | | | |
| 251 | # zero: the sign of the samples represents a bit state. Pack these values | | | |
| 252 | # into a byte, representing the Real+Imag states for four sequential samples. | | | |
| 253 | # Simultaneously, flag samples from the prior pass that were received | | | |
| 254 | # with inadequate power levels, in order to minimize noise triggering. | | | |
| 255 | # | | | |
| 256 | 0100 3C46C046 | c.lt.ps | $fcc6,$f8,$f0 | # Get sign of R0 and I0 in CC.0-1 |
| 257 | 0104 25186100 | or | $3,$1 | # Merge power status with new bits |
| 258 | 0108 3C44C146 | c.lt.ps | $fcc4,$f8,$f1 | # Get sign of R1 and I1 in CC.2-3 |
| 259 | 010c 25504301 | or | $10,$3 | # Set bits if not at proper power: offset 0 |
| 260 | 0110 25586301 | or | $11,$3 | # Set bits if not at proper power: offset 2 |
| 261 | 0114 3C42C246 | c.lt.ps | $fcc2,$f8,$f2 | # Get sign of R2 and I2 in CC.4-5 |
| 262 | 0118 25608301 | or | $12,$3 | # Set bits if not at proper power: offset 4 |
| 263 | 011c 2568A301 | or | $13,$3 | # Set bits if not at proper power: offset 6 |
| 264 | 0120 3C40C346 | c.lt.ps | $fcc0,$f8,$f3 | # Get sign of R3 and I3 in CC.6-7 |
| 265 | # | | | |
| 266 | # Apply a mask so that the data values and power levels at symbol transition | | | |
| 267 | # points are ignored - if a masked value is 0, this indicates that a preamble | | | |
| 268 | # has been found at the relevant shift count offset. Also, merge the signal | | | |
| 269 | # power levels for even & odd samples. | | | |
| 270 | # | | | |
| 271 | 0124 24505201 | and | $10,$18 # Ignore bits at transition points - offset 0 | |
| 272 | 0128 24587301 | and | $11,$19 # Ignore bits at transition points - offset 2 | |
| 273 | 012c C02AC546 | add.ps | $f11,$f5,$f5 | # Sum odd sample power values |

-continued

| | | | | | |
|---|---|---|---|---|---|
| 274 | 0130 8022C646 | add.ps | $f10,sf4,sf6 | | # Sum even sample power values |
| 275 | 0134 10004011 | beq | $10,$0,decp6 | | #Found a preamble at offset 0 - set shift to 0 |
| 276 | 0138 24609401 | and | $12,$20 | | # Ignore bits at transition points - offset 4 |
| 277 | 013c 0D006011 | beq | $11,$0,decp5 | | # Found a preamble at offset 2 - set shift to 1 |
| 278 | 0140 2468B501 | and | $13,$21 | | # Ignore bits at transition points - offset 6 |
| 279 | 0144 0A008011 | beq | $12,$0,decp4 | | # Found a preamble at offset 4 - set shift to 2 |
| 280 bits | 0148 00C84144 | cfc1 | $1,$25 # FCCR # Read signs of samples = non-diff. RX Data | | |
| 281 | 014c 0700A011 | beq | $13,$0,decp3 | | # Found a preamble at offset 6 - set shift to 3 |
| 282 | 0150 00000000 | nop | | | # Fill the branch delay slot |
| 283 | | # | | | |
| 284 | | # Decode the input samples received in this pass into binary, preparing | | | |
| 285 | | # for analysis during the next pass. Loop until a preamble is found, or | | | |
| 286 | | # until the end of the input buffer for this channel is reached. | | | |
| 287 | | # | | | |
| 288 | 0154 38120200 | dsll | $2,8 | | # Shift pattern reg to make room for new bits |
| 289 | 0158 2000A524 | addu | $5,4*8 | | # Point to the next group of samples |
| 290 | 015c 25104100 | or | $2,$1 | | # Merge new data bits into RX data register |
| 291 | 0160 D1FFA714 | bne | $5,$7,decp2 | | # Loop until at end of buffer |
| 292 | 0164 00000000 | nop | | | # Fill the branch delay slot |
| 293 | 0168 04000010 | b | decp7 | | # Return with shift count set to 'not found' |
| 294 | | # | | | |
| 295 | | # Found a preamble - set the shift count for proper alignment of the data | | | |
| 296 | | # bits which follow the preamble (used by QPSK_Demodulate). | | | |
| 297 | | # | | | |
| 298 | 016c 01002925 | decp3: | addu | $9,1 | # Increment shift count (will become 4) |
| 299 | 0170 01002925 | decp4: | addu | $9,1 | # Increment shift count (will become 3) |
| 300 | 0174 01002925 | decp5: | addu | $9,1 | # Increment shift count (will become 2) |
| 301 | 0178 01002925 | decp6: | addu | $9,1 | # Increment shift count (will become 1) |
| 302 | | # | | | |
| 303 | | # Save the current sample states so that a preamble which crosses block boundaries | | | |
| 304 | | #can still be decoded successfully, and return the location of the preamble if found, | | | |
| 305 | | # or 0 if not found. The preamble and powerstatus bit arrays are also updated. | | | |
| 306 | | # | | | |
| 307 | 017c 0051CB46 | decp7: | add.ps $f4,$f10,$f11 | | # Perform final merge of power samples |
| 308 | 0180 480000F4 | sdc1 | $f0,sample_4($4) | | # Store previous sample value[−4] for next call |
| 309 | 0184 400001F4 | sdc1 | $f1,sample_3($4) | | # Store previous sample value[−3] for next call |
| 310 | 0188 380002F4 | sdc1 | $f2,sample_2($4) | | # Store previous sample value[−2] for next call |
| 311 | 018c 300003F4 | sdc1 | $f3,sample_1($4) | | # Store previous sample value[−1] for next call |
| 312 | 0190 2000A130 | and | $1,$5,4*8 | | # Find if 1st or 2nd half of 8 sample block |
| 313 | 0194 2628A100 | xor | $5,$1 | | # Mask address for start of this 8-sample blk |
| 314 | 0198 C2080100 | srl | $1,3 | | # Divide offset by sample size to get 0, or 4 |
| 315 | 019c 21482101 | addu | $9,$1 | | # Make shift count go from 0-7 |
| 316 | 01a0 000002FC | sd | $2,preamble($4) | | # Store the current preamble status in memory |
| 317 | 01a4 700009AC | sw | $9,shiftcnt($4) | | # Save the shift count (offset) for the preamble |
| 318 | 01a8 2310E500 | subu | $2,$7,$5 | | # Get the current count value in $2 |
| 319 | 01ac 080003FC | sd | $3,powerstat($4) | | # Store the power status in memory |
| 320 | 01b0 C2100200 | srl | $2,3 | | # Divide byte count by 8 to get sample count |
| 321 | 01b4 0800E003 | j | $31 | | # Return with count value in $2... |
| 322 | 01b8 100004F4 | sdc1 | $f4,noisepwr($4) | | # ...after storing the summed noise power |
| 323 | .end | | detect_preamble | | |
| 324 | | | | | |
| 325 | | | | | |
| 326 | /*******************************************************************/ | | | | |
| 327 | /* | PREAMBLE DETECTION PATTERNS | | | */ |
| 328 | /*******************************************************************/ | | | | |
| 329 | 01bc 00000000 | | .sdata | | |
| 330 | | | | | |
| 331 | 0000 00FCFFFC | patmask:.dword | 0xFCFCFCFCFCFFFC00 | | # Preamble mask for offset 0 |
| 331 | FCFCFCFC | | | | |
| 332 | # | .dword | 0x3F3F3F3F3F3FFF00 | | #(Preamble mask for offset 2) |
| 333 | # | .dword | 0x0FCFCFCFCFCFFFC0 | | #(Preamble mask for offset 4) |
| 334 | # | .dword | 0x03F3F3F3F3F3FFF0 | | #(Preamble mask for offset 6) |
| 335 | | | | | |
| 336 | 0008 000000FC | pattern:.dword 0xFC00FC00FC000000 #Preamble pattern at offset 0 | | | | |
| 336 | 00FC00FC | | | | |
| 337 | # | .dword | 0x3F003F003F000000 | | #(Preamble pattern for offset 2) |
| 338 | # | .dword | 0x0FC00FC00FC00000 | | #(Preamble pattern for offset 4) |
| 339 | # | .dword | 0x03F003F003F00000 | | #(Preamble pattern for offset 6) |

DEFINED SYMBOLS

```
                        *ABS*:0000000000000000 preamble.S
                        *ABS*:0000000000000000 channel.h
                        *ABS*:0000000000000000 preamble.S
          preamble.S:164 .text:0000000000000010 detect_preamble
          preamble.S:198 .text:0000000000000044 decp1
          preamble.S:184 .text:000000000000002c detect_preamble_next
          preamble.S:336 .sdata:0000000000000008 pattern
          preamble.S:331 .sdata:0000000000000000 patmask
          preamble.S:220 .text:00000000000000a8 decp2
```

```
         preamble.S:301  .text:0000000000000178 decp6
         preamble.S:300  .text:0000000000000174 decp5
         preamble.S:299  .text:0000000000000170 decp4
         preamble.S:298  .text:000000000000016c decp3
         preamble.S:307  .text:000000000000017c decp7
NO UNDEFINED SYMBOLS
```

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A preamble detector for QPSK, comprising:
an input for receiving digitized input I and Q samples, wherein said input I and Q samples represent a reconstructed base band form of QPSK modulation;
a carrier derotation means for aligning said incoming signal phases with I and Q axes;
sign means for producing a '1' if said I and Q samples are greater than or equal to 0, or a '0' if said samples are less than 0;
sample delay means for providing chains of N-sample delays to yield one symbol-length delay for both I and Q;
a differential decoder for combining a current symbol state with a prior symbol state to yield a differentially decoded symbol value;
a multiplexer for alternating between a least-significant and a most-significant bit of said differentially decoded symbol values; and
a preamble shift register containing a serial-sequential representation of a received data stream.

2. The detector of claim 1:
wherein said shift register length is twice a number of bits in a preamble; and
wherein binary data bits are clocked into said preamble shift register at two bits/sample.

3. The detector of claim 2, said shift register further comprising:
XOR means for locating a unique preamble data pattern in accordance with the following:

Preamble_Mismatch=Preamble_Register XOR PREAMBLE_PATTERN wherein said PREAMBLE_PATTERN is a bit-pair doubled representation of a unique data pattern that defines an implementation-specific value for said preamble;
wherein Preamble_Mismatch indicates outputs of said XOR means;
wherein said XOR means invert any bits in said preamble that should be a binary '1;' and
wherein when outputs of said XOR means all become zero, indicating no mismatch, a data pattern has been identified that matches a desired preamble data pattern.

4. The detector of claim 3, further comprising:
means for producing a value of modulation power, where:

power$_k$=abs(real($R_k$)·real($R_{k-N}$))+abs(imag($R_k$)·imag($R_{k-N}$)).

5. The detector of claim 3, further comprising:
a comparator for comparing said signal power level to a predetermined minimum acceptable power threshold;
wherein an output of said comparator is a '1' if an input signal level is too low to be considered a valid transmission, and said comparator output is '0' if said power level exceeds said threshold;
a Power_Invalid shift register which receives said comparator output, said Power_Invalid shift register containing a history of an invalidity status of recent samples; and
OR means for merging Power_Invalid flags with Preamble_Mismatch outputs, resulting in a product expression of:

Preamble_Status=Preamble_Mismatch OR Power_Invalid wherein a candidate preamble has both a proper bit polarity and a proper signal level; and
wherein said OR means combine said I and Q data bits, whereby if either of said I or Q samples have incorrect signs, then an output of that sample from said OR means becomes true to indicate a non-matching symbol.

6. The detector of claim 5, further comprising:
AND means for isolating N-1 out of N samples to ignore one sample/symbol during which zero-crossings may occur;
wherein with two samples/symbol, said AND means isolates alternate samples.

7. The detector of claim 6, further comprising:
NOR means;
wherein once all relevant samples have proper signs, and have been received with a sufficient power level, an output of said NOR means is driven high, indicating Preamble_Found;
wherein said detector begins the process of receiving a new data burst.

8. The detector of claim 1, wherein, if a preamble used is an unchanging constant, said detector further comprising:
NOT means inserted selectively at any sample timing offset where an expected value of a preamble is '1.'

9. The detector of claim 1, wherein said shift register is extendable to use said detector with any integer number of samples/symbol, or any preamble length.

10. A preamble detection method for QPSK, comprising the steps of:
receiving digitized input I and Q samples, wherein said input I and Q samples represent a reconstructed base band form of QPSK modulation;
aligning said incoming signal phases with I and Q axes;
producing a '1' if said I and Q samples are greater than or equal to 0, or a '0' if said samples are less than 0;
providing chains of N-sample delays to yield one symbol-length delay for both I and Q;
combining a current symbol state with a prior symbol state to yield a differentially decoded symbol value;
alternating between a least-significant and a most-significant bit of said differentially decoded symbol values; and providing a serial-sequential representation of a received data stream.

11. The detection method of claim 10:
wherein said serial-sequential representation of a received data stream length is twice a number of bits in a preamble; and
wherein binary data bits are clocked in at two bits/sample.

12. The detection method of claim 11, further comprising the step of:
locating a unique preamble data pattern in accordance with the following:

Preamble_Mismatch=Preamble_Register XOR PREAMBLE_PATTERN wherein said PREAMBLE_PATTERN is a bit-pair doubled representation of a unique data pattern that defines an implementation-specific value for said preamble;
wherein Preamble_Mismatch indicates an XOR output;
wherein any bits in said preamble that should be a binary '1' are inverted; and
wherein when said XOR output becomes zero, indicating no mismatch, a data pattern has been identified that matches a desired preamble data pattern.

13. The detection method of claim 12, further comprising the step of:
implementing a power estimation function;
producing a value of modulation power, where:

$$\text{power}_k = abs(\text{real}(R_k) \cdot \text{real}(R_{k-N})) + abs(\text{imag}(R_k) \cdot \text{imag}(R_{k-N})).$$

14. The detection method of claim 12, further comprising the steps of:
comparing said signal power level to a predetermined minimum acceptable power threshold;
wherein an output of said comparing step is a '1' if an input signal level is too low to be considered a valid transmission, and said comparing step output is '0' if said power level exceeds said threshold;
receiving said comparing step output a Power_Invalid shift register, said Power_Invalid shift register containing a history of an invalidity status of recent samples; and
merging Power_Invalid flags with Preamble_Mismatch outputs, resulting in a product expression of:

Preamble_Status=Preamble_Mismatch OR Power_Invalid wherein a candidate preamble has both a proper bit polarity and a proper signal level; and
wherein said merging step combines said I and Q data bits, whereby if either of said I or Q samples have incorrect signs, then an output of that sample from said merging step becomes true to indicate a non-matching symbol.

15. The detection method of claim 14, further comprising the step of:
isolating N-1 out of N samples to ignore one sample/symbol during which zero-crossings may occur;
wherein with two samples/symbol, alternate samples are isolated.

16. The detection method of claim 15, wherein once all relevant samples have proper signs, and have been received with a sufficient power level, an output is driven high, indicating Preamble_Found;
wherein said detector begins the process of receiving a new data burst.

17. The detection method of claim 10, wherein, if a preamble used is an unchanging constant, said detector further comprising the step of:
inserting a NOT function selectively at any sample timing offset where an expected value of a preamble is '1.'

18. The detection method of claim 10, further comprising the step of:
extending said detector with any integer number of samples/symbol, or any preamble length.

* * * * *